Oct. 28, 1941.　　　R. G. FERRIS　　　2,260,307
HAY SILO
Filed Jan. 26, 1939　　　4 Sheets-Sheet 1

Inventor:
Robert G. Ferris:
By Chritton, Wiles, Davies, Hirschl & Dawson,
Att'ys

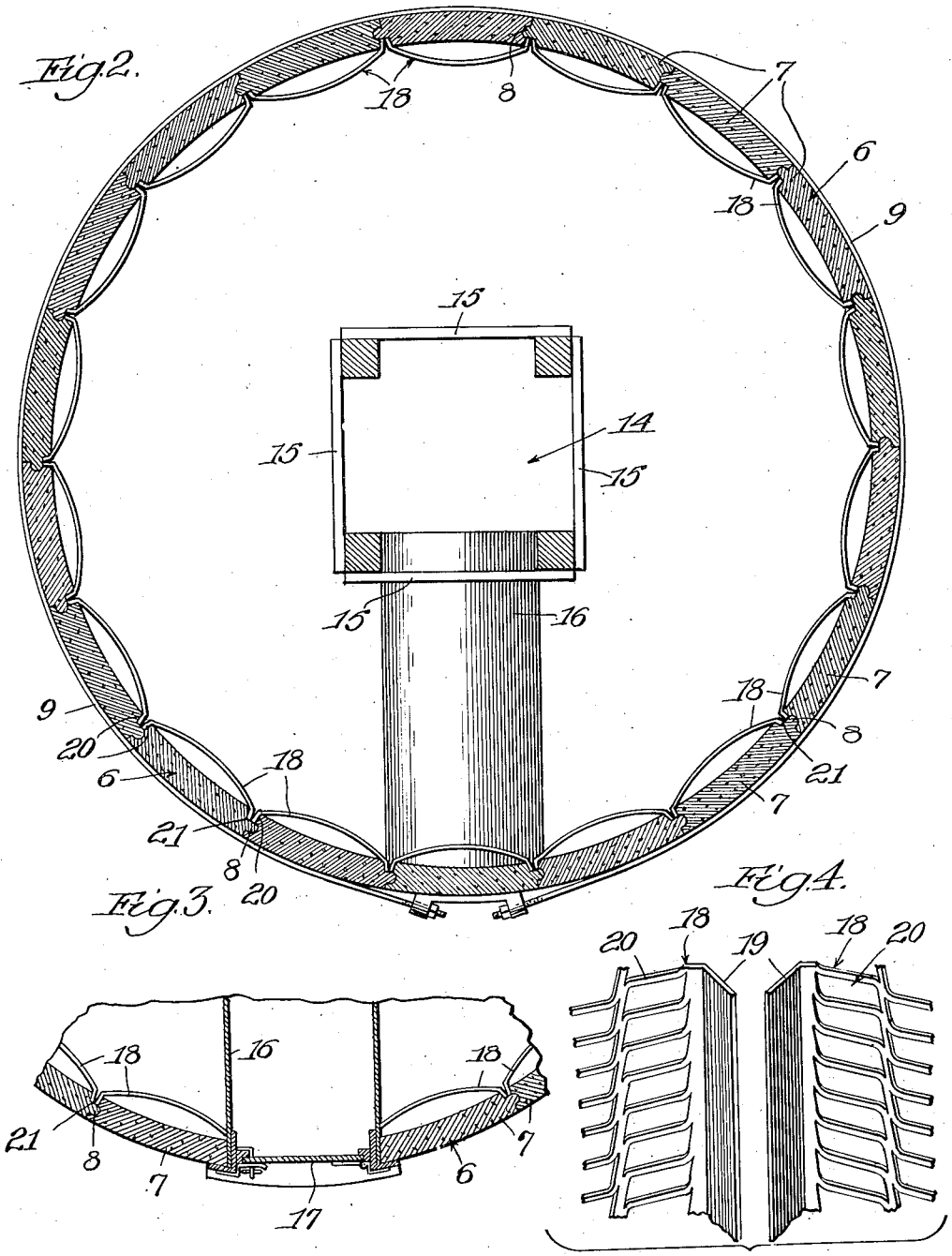

Oct. 28, 1941.    R. G. FERRIS    2,260,307
HAY SILO
Filed Jan. 26, 1939    4 Sheets-Sheet 3
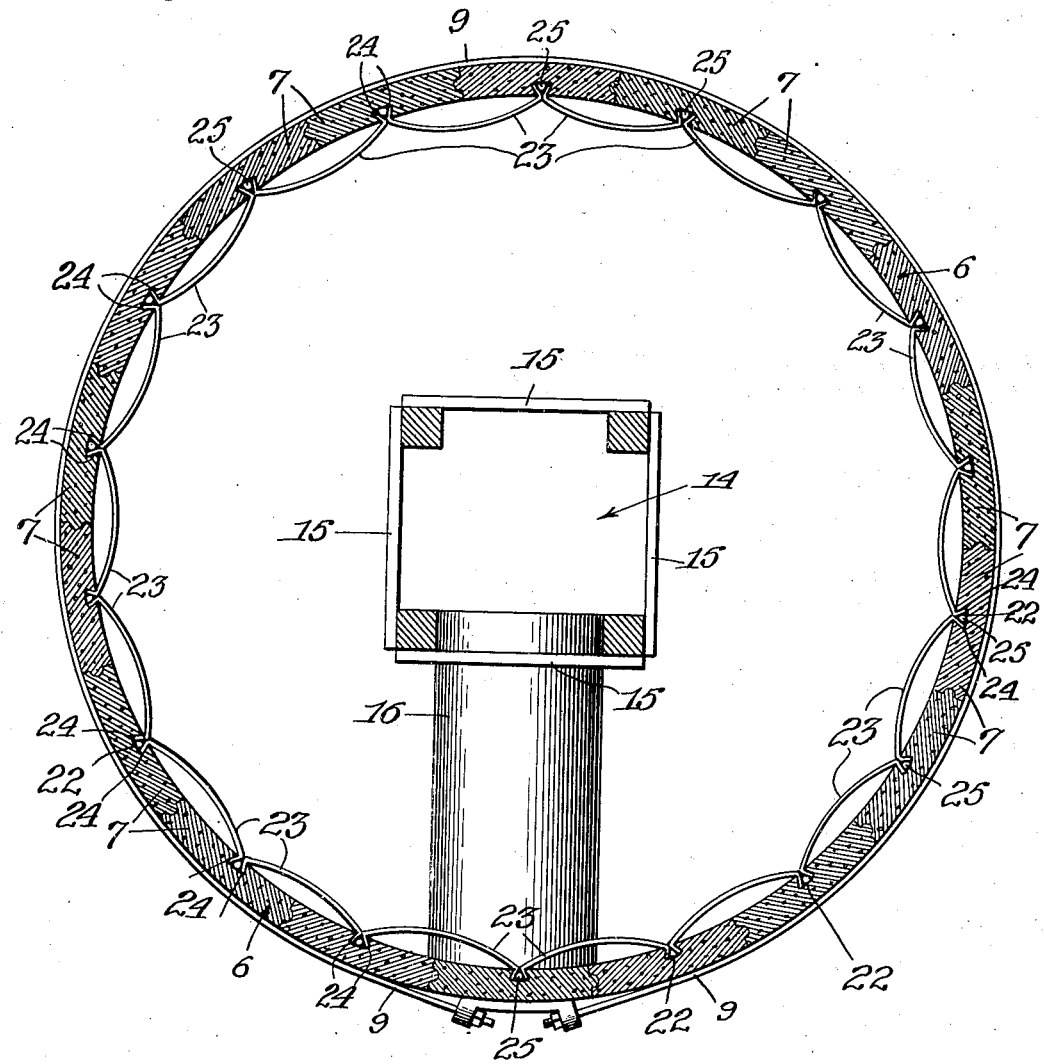
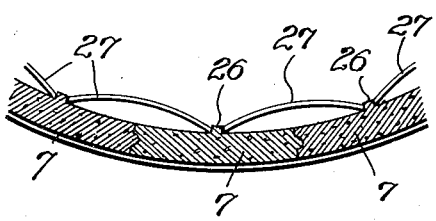

Oct. 28, 1941.   R. G. FERRIS   2,260,307
HAY SILO
Filed Jan. 26, 1939   4 Sheets-Sheet 4
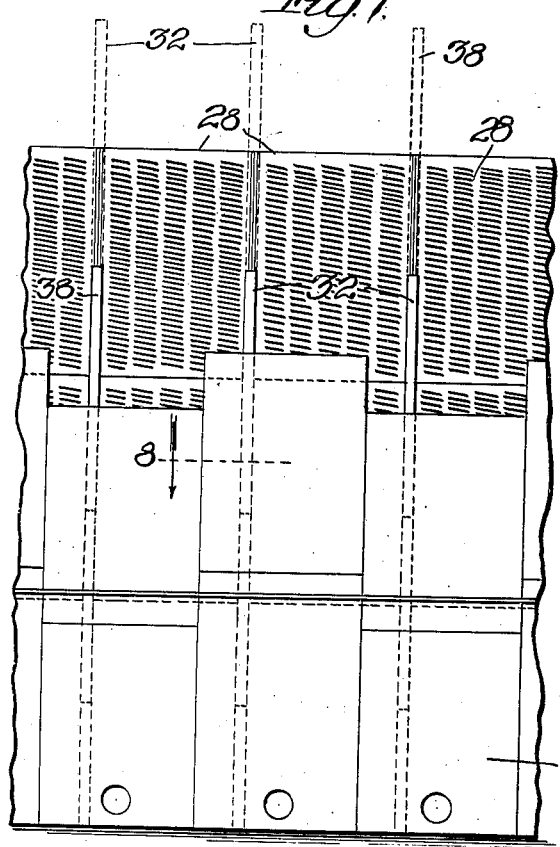
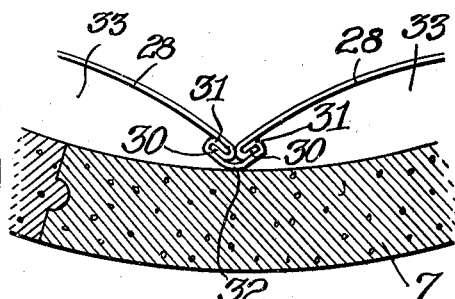
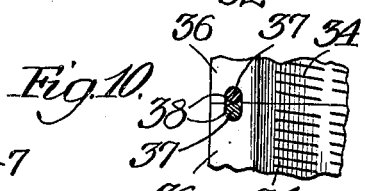
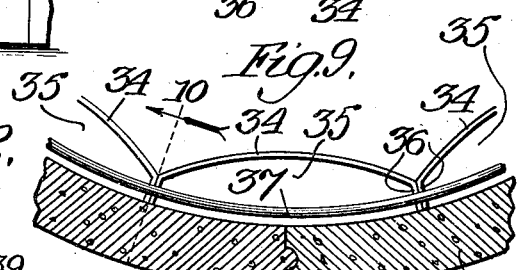
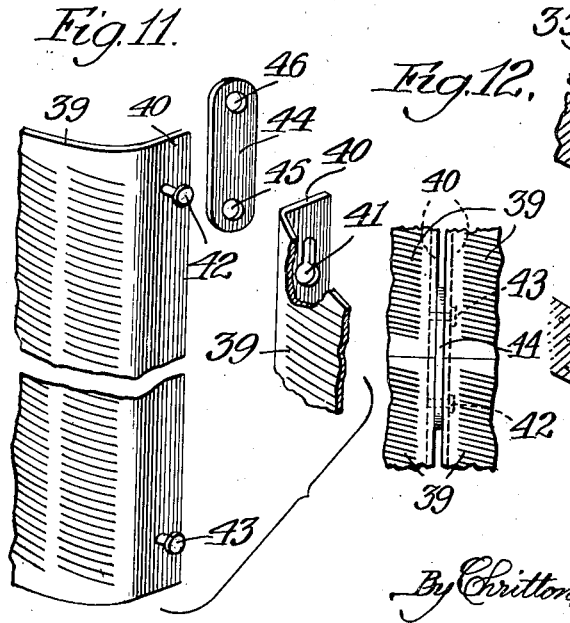
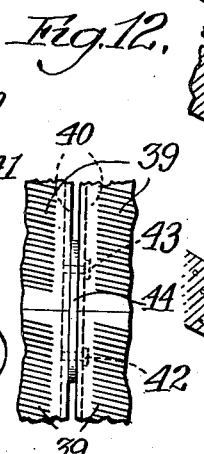
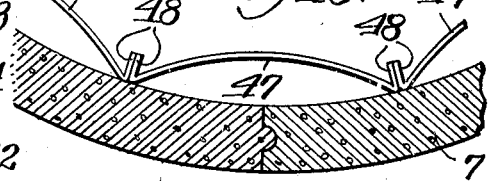
Inventor:
Robert G. Ferris,
By Critton, Wiles, Davies, Hirschl & Dawson,
Attys.

Patented Oct. 28, 1941

2,260,307

UNITED STATES PATENT OFFICE 2,260,307

HAY SILO

Robert G. Ferris, Harvard, Ill., assignor to Starline, Inc., Harvard, Ill., a corporation of Illinois Application January 26, 1939, Serial No. 253,018

10 Claims. (Cl. 98—54)

My invention relates to improvements in hay silos which, as is understood by those skilled in the art, must be provided with means for ventilating the hay stored therein; my primary object being to provide a novel, simple and inexpensive construction of silo having provision for the proper ventilation of hay and one which may be economically and quickly erected; and other objects as will be manifest from the following description.

Referring to the accompanying drawings:

Figure 2 is a plan sectional view of the silo, the section being taken at the line 2 on Fig. 1 and viewed in the direction of the arrow.

Figure 3 is a fragmentary plan sectional view of the door-equipped portion of the silo, the section being taken at the line 3 on Fig. 1 and viewed in the direction of the arrow.

Figure 4 is a perspective view illustrating the form of liner plates forming parts of the construction.

Figure 5 is a view like Fig. 2 illustrating a modification.

Figure 6 is a fragmentary plan sectional view of another modification of the construction.

Figure 7 is a fragmentary outer face view of the wall of a silo showing it as equipped with flue-forming liner plates in accordance with another embodiment of the invention.

Figure 8 is an enlarged fragmentary plan sectional view of the structure of Fig. 7, the section being taken at the line 8 on Fig. 7 and viewed in the direction of the arrow.

Figure 9 is a fragmentary plan sectional view of the wall of a silo provided with flue-forming liner plates in accordance with another embodiment of the invention.

Figure 10 is a fragmentary sectional view taken at the line 10 on Fig. 9 and viewed in the direction of the arrow.

Figure 11 is a fragmentary perspective view of two liner plates of still another construction with a different construction of connecting means therefor in accordance with another embodiment of the invention, the parts shown being in separated, but related, position.

Figure 12 is a fragmentary face view of two adjacent plates of Fig. 11 in each of two juxtaposed horizontal courses of the plates; and Figure 13, a view like Fig. 12, showing another embodiment of the invention.

Figure 1:
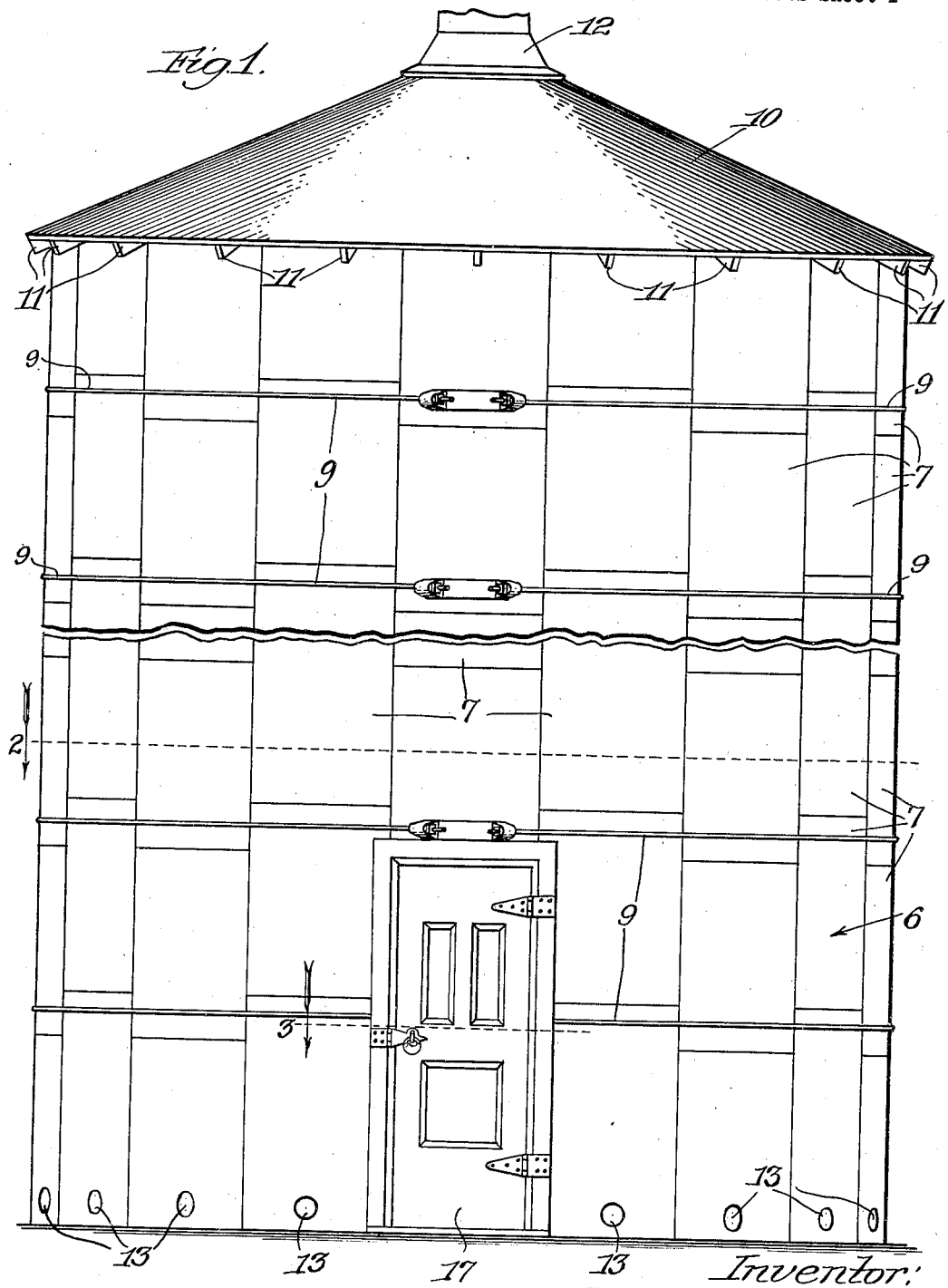
Figure 1 is a view in side elevation of a silo embodying my invention, the central portion thereof being broken away.

Referring to the construction shown in Figs. 1-4, inclusive, the silo comprises a main wall 6 which is circular in cross section and is formed of staves in the form of concrete slabs 7 arranged in horizontal circular courses disposed in a vertical series, each course being formed of a series of the slabs 7, the slabs 7 having tongue and groove connection with each other along their vertical edges, as represented at 8 and being held against outward displacement by hoops 9 surrounding the wall structure thus produced.

At the top of the wall 6 thus formed is a roof 10 supported at radial stringers 11 on the top of the wall 6, and at the center thereof is a conventional barn ventilator, only the base 12 of which is illustrated.

The slabs 7 of the lowermost course have openings 13 to admit air to the silo, and extending upwardly in the silo at its center, from the bottom of the silo to its top is a reticulated flue 14, the reticulations being formed by way of example by forming the surrounding side walls of the flue of vertical series of horizontal slats vertically spaced apart.

The bottom of the flue 14 opens laterally into a cross tunnel 16 provided at its outer end with a door 17.

In accordance with my invention I provide means adjacent the inner surface of the wall 6 for holding the hay deposited in the silo in the space surrounding the flue 14, away from the wall 6 and thus provide at this location for ventilation of the hay, these means being of reticulated form to provide for cross ventilation.

The means referred to, in accordance with the embodiment of the invention shown in Figs. 1-4, comprise horizontal circular courses of plates 18 disposed in a vertical series extending from the top to the bottom of the wall 6, each course being formed of an annular series of these plates and each plate being of a width substantially equal to the width of the slabs 7.

The plates 18 between their vertical edge portions 19 are of expanded metal form as represented at 20 in Fig. 4 (this view showing portions of two adjacent ones of these similar plates), the vertical edge portions 19 of each plate and which are shown as solid, being outwardly bent; in the particular construction shown bent to extend at an angle to the body of the plate, whereby each plate is of general channel form.

The wall 6 at its inner surface is formed to provide vertical recesses 21 at each vertical joint between adjacent ones of the slabs 7, as shown of two of the horizontal courses of slabs in Figs. 2 and 3, the plates 18 extending at their edge portions 19 into these recesses as shown in these figures wherein they are held against displacement. In this arrangement the plates 18 are of such normal width as to require the edge portions 19 to be sprung toward each other, the plates thus assuming inwardly bowed or arched form, to permit the edge portions to enter the recesses 21 whereby the plates are held in place in the recesses by the spring tension of the material forming the plates, the edges of adjacent plates mutually abutting in the recesses.

The bowed, or arched body portions of the plates 18 thus are spaced from the wall 6 to form reticulated flues which in the particular arrangement shown extend continuously from the top to the bottom of the wall.

The construction shown in Fig. 5 is the same as that of the preceding figures of the drawings except that instead of providing the vertical recesses 21 for the reticulated liner plates 18, at the joints between adjacent slabs 7, such recesses are formed between opposite edges of the slabs 7 and are of dovetail shape, as illustrated at 22, and the edge portions of the plates, herein represented at 23 and corresponding with the plates 18 and having their body portions reticulated as in the case of the plates 18 (their edge portions being shown at 24) are deflected at such an angle to the body portions of the plates as to cause these edge portions to interlock with the undercut walls of the recesses 22. In this case the plates 23 in normal condition are of inwardly bowed form and of such width as to require the springing of the edge portions 24 away from each other to enter them in the recesses 22. Preferably rods 25 forming keys are slid lengthwise into the recesses 22 between the adjacent edge portions 24 of the plates to insure the locking of these plates in position. The recesses 22 in the slabs 7 of each vertical series thereof preferably are in substantial vertical alignment whereby vertical flues formed by the plates 23 and wall 6 and extending from the top to the bottom of the wall, are provided.

The construction shown in Fig. 6 is the same as that shown in Figs. 1-4 except that instead of providing recesses at the vertical joints between the slabs to receive the edges of the liner sections, the slabs are provided with vertical inwardly extending ribs shown at 26 forming abutments for the vertical edge portions of the reticulated liner plates herein shown at 27. The plates 27, to apply them to the wall 6, are sprung inwardly at their opposite edges to enter them between adjacent ribs 26, the spring tension of the plates thus holding them in position against the ribs.

As will be understood, the liner sections if desired, may be provided of less width in which case the recesses 24 of Fig. 5 and the ribs 26 of Fig. 6 may be correspondingly closer placed, and if necessary a plurality of the recesses 24 or ribs 26 provided on each slab.

In the case of the several kinds of plates 18, 23 and 27, the body portions thereof in assembled relation to the wall 6 are preferably inwardly bowed crosswise of the plates throughout the height thereof as shown.

In accordance with the showing in Figs. 7 and 8, the liner plates herein represented at 28 are of reticulated form, as for example by providing all of the portions thereof except their vertical marginal edges, of expanded metal form. These liner plates are of inwardly bowed or arched form as shown and are arranged to form a vertical series of horizontal circular courses, thereof, each course being formed of a plurality of the plates extending about the inner periphery of the wall 7 of the silo, the plates 28 being preferably sprung into such bowed or arched form in assembling them around the side of the wall.

The opposite vertical edges of each plate 28 are turned outwardly and then backwardly to form flanges 30 spaced from the bodies of the plates whereby the flanges 30 of adjacent plates are adapted to interlock with the inturned edges 31 of a sheet metal locking strip 32 of general V-shape in cross section, the strip 32 being assembled into interlocked relation with adjacent ones of the plates 28 by sliding the strip 32 downwardly along these plates, the joints thus provided between adjacent plates 28 being in the nature of the common sheet metal lock seam joints.

Preferably the locking strips 32 for the lowermost horizontal course of plates 28 are of less length than the height of the plates and the strips 32 for the other, superposed, horizontal courses of plates 28 are of substantially the same length as the height of these plates. Thus the strips 32 break-joint between the upper and lower edges of all of the plates 28, thereby locking adjacent ones of all of the courses of the plates 28 to each other to prevent relative rotatable displacement of these courses.

As will be understood, this liner construction serves, with the wall 7, to form vertical flues 33 around the inside of the wall 7 through which air for ventilating the material in the silo may flow as explained of the construction shown in Figs. 1-4, inclusive.

In the arrangement shown in Figs. 9 and 10, liner plates represented at 34, are provided in a vertical series of horizontal circular courses around the inside of the wall 7 of the silo to form vertical flues 35 for the same purpose as the vertical flues of the constructions of the preceding figures of the drawings, the plates 34 of adjacent courses being in vertical alignment.

The bodies of the plates 34 are of reticulated form, as for example of expanded metal form, and are inwardly bowed or arched, with their vertical edges 36 bent outwardly to cause such edges of adjacent plates to mutually flatwise engage, as shown, and at which portions the plates bear against the inner surface of the wall 7. The plates 34 of each horizontal course are connected together by heavy wires 37 which extend into notches 38 in the upper and lower edges of the edge portions 36.

In the arrangement shown in Figs. 11 and 12 the liner plates are represented at 39 and are provided in a vertical series of horizontal circular courses extending around the inside of the wall 7 of the silo to form, with this wall, vertical flues for the same purpose as the vertical flues of the constructions of the preceding figures of the drawings, the plates 39 of adjacent courses being in vertical alignment.

The bodies of the plates 39 are of reticulated form, as for example of expanded metal form, and are inwardly bowed or arched, as in the case of the plates 34, their vertical edges 40 being bent outwardly to cause such edges of adjacent plates to oppose each other flatwise as shown. The plates 39 of each horizontal course are connected together at their upper and lower portions by keyhole and shoulder rivet means provided on opposed ones of the edge portions 40, one of the keyholes being represented at 41 and the rivet stud cooperating therewith at 42, it being understood that another one of the keyholes 41 would be provided at the lower edge of the plate 39 carrying it for interlocking with the headed rivet 43 at the lower end of the adjacent side portion 40.

Preferably each horizontal course of the plates 39 would be connected with the juxtaposed courses of plates above and below it to prevent relative rotation of these courses, as for example by providing links engaging the rivets of plates in these courses. One of these links is shown at 44 and has an aperture 45 at its lower end to receive the rivet 42 and is interposed between the two plates connected by this rivet and the cooperating keyhole slot 41, the link 44 extending above these connected plates and having an opening 46 at its upper end to receive the rivet of the keyhole and shoulder rivet means for connecting together the lower ends of the adjacent plates of the horizontal course above it as illustrated more particularly in Fig. 12.

In the arrangement shown in Fig. 13 the reticulated liner plates, herein shown at 47, are arranged in horizontal courses about the inner surface of the wall 7 as described of the liner plates of Fig. 9; these plates being held in place against the wall 7 by mutual abutment of their vertical edge portions, shown as inwardly extending flanges 48, under the spring tension of the plates 47 which are inwardly sprung in their assembled relation with the wall, the tendency of the plates to straighten causing them to press against the wall.

As will be understood from the foregoing, any one of the constructions shown in Figs. 7–13, inclusive, presents the advantage of not requiring the inner surface of the surrounding wall of the silo to be of a special form to cooperate with the liner plates, thereby permitting the invention to be applied to the walls of silos as already built; in which case openings in the lower ends of the wall into the flues formed between the liner plates and the wall, if not present in the wall as originally constructed, would be provided.

It will be understood from the foregoing that the parts forming the structure may be easily and quickly assembled and the structure thus provided afford the required ventilation of the storage of hay while protecting it against entry of such moisture as might damage it, the air which is thus caused to flow in widely diversified paths through the hay and discharging through the roof, affording ready opportunity for the escape of moisture from the hay even when the silo is of relatively large size and avoiding spontaneous combustion.

The provision of the liner plates as inwardly bowed or arched structures, whether or not the plates in this condition are in normal condition or in sprung condition, is of great advantage as these plates are thus rendered of the most suitable form for resisting deformation when subjected to the forces imposed against them by the body of material charged into the silo. It has been found in practice that by providing these liner plates as relatively narrow structures, as for example in the order of about 12 inches in width, and causing them to be inwardly bowed or arched in assembled condition with the surrounding wall of the silo, that they may be made of relatively thin gage metal and still present the desired resistance to deformation when the silo is charged with material, and thereby afford with the surrounding wall the desired cross-section of flues extending upwardly along the inner surface of the wall. Furthermore, the provision of the liner plates as inwardly bowed or arched structures is of further advantage as thereby a considerably greater aerated area may be presented by the liner structure than in the case of a liner structure disposed concentric with the inner surface of the wall of the silo, thus enhancing the ventilating effect.

While I have shown and described certain particular embodiments of my invention I do not wish to be understood as intending to limit it thereto as the same may be variously modified and altered and the invention embodied in other forms of structure without departing from the spirit of my invention. In this connection it may be stated that while the wall 6 is shown as formed of slabs 7 this is not necessary in carrying out my invention in accordance with certain phases thereof, as the wall, if desired, may be made monolithic as by casting the concrete, when used, progressively to form a one piece wall. Furthermore, the inner face of the wall whether formed of sections, such as the slabs 7, or as a monolithic structure, may be formed as chords of a circle instead of arcuate surfaces defining a circle.

What I claim as new and desire to secure by Letters Patent, is:

1. A silo comprising a main surrounding wall structure having recesses in its inner surfaces, apertured liner sections for said wall and spaced therefrom, said sections extending at their opposite edge portions into said recesses, and members in said recesses located between adjacent ones of said edge portions for holding said edge portions in said recesses.

2. A silo comprising a main surrounding wall structure having dovetail recesses in its inner surface, apertured liner sections for said wall and spaced therefrom, said sections extending at their opposite edge portions into said recesses, and members in said recesses located between adjacent ones of said edge portions and holding said edge portions in lapped relation to the undercu walls of said recesses.

3. A silo comprising a main surrounding wall structure, apertured inwardly archede edge-abutting liner plates for said wall and spared therefrom, and means connecting said plates together.

4. A silo comprising a main surrounding wall structure, apertured inwardly arched liner plates for said wall and spaced therefrom, and means, independent of said wall, connecting said plates together.

5. A silo comprising a main wall, reticulated liner sections for said wall, said sections bearing against said wall and being inwardly sprung and mutually abutting at adjacent edges under the spring tension of said sections.

6. A silo comprising a main wall, reticulated liner sections for said wall, said sections bearing against said wall and being inwardly sprung and having flanges at their lateral edges at which they mutually abut under spring tension, said sections being held in place against said wall solely by said mutual abutting of adjacent sections under spring tension.

7. A silo comprising a wall structure having recesses in a surface thereof, and apertured arched liner plates for said wall and spaced from said surface, said plates being sprung and the edges of adjacent plates disposed, and secured, in the same recesses.

8. A silo comprising a wall structure having recesses in a surface thereof, and apertured arched liner plates for said wall and spaced from said surface, said plates being sprung, the edges of adjacent plates being in contact and disposed, and secured, in the same recesses.

9. A silo comprising a wall structure having recesses in a surface thereof, and apertured arched liner plates for said wall and spaced from said surface, said plates being sprung, and the edges of adjacent plates disposed in the same recesses, and spacers in said recesses holding said edges in place.

10. A silo comprising a main wall structure, apertured arched liner plates for said wall spaced therefrom, said plates being flanged at edges thereof with the flanges of adjacent plates in engagement with each other, and wires extending continuously through said flanges at the points of engagement of such flanges, said wires being spaced from said wall.

ROBERT G. FERRIS.

CERTIFICATE OF CORRECTION.

Patent No. 2,260,307.　　　　　　　　　　　　　　October 28, 1941.

ROBERT G. FERRIS.

It is hereby certified that error appears in the printed specification of the above numbered patent requiring correction as follows: Page 3, second column, line 49, claim 3, for "archede" read --arched--; and line 50, same claim, for "spared" read --spaced--; and that the said Letters Patent should be read with this correction therein that the same may conform to the record of the case in the Patent Office.

Signed and sealed this 16th day of December, A. D. 1941.

Henry Van Arsdale,
(Seal)　　　　　　　　　　　　　　　　　　Acting Commissioner of Patents.